United States Patent
Williamson

(10) Patent No.: US 11,351,903 B1
(45) Date of Patent: Jun. 7, 2022

(54) SUSPENSION SYSTEM AND ROTARY TONGUE LEVER SYSTEM FOR USE WITH A TOWABLE TRAILER

(71) Applicant: Richard Leslie Williamson, Ocala, FL (US)

(72) Inventor: Richard Leslie Williamson, Ocala, FL (US)

( * ) Notice: Subject to any disclaimer, the term of this patent is extended or adjusted under 35 U.S.C. 154(b) by 0 days.

(21) Appl. No.: 17/411,090

(22) Filed: Aug. 25, 2021

(51) Int. Cl.
*B60P 1/02* (2006.01)
*B60G 17/052* (2006.01)
*B62D 63/08* (2006.01)

(52) U.S. Cl.
CPC ............ *B60P 1/027* (2013.01); *B60G 17/052* (2013.01); *B62D 63/08* (2013.01); *B60G 2300/04* (2013.01)

(58) Field of Classification Search
CPC ... B60P 1/027; B60G 17/052; B60G 2300/04; B62D 63/08; B62D 53/065
See application file for complete search history.

(56) References Cited

U.S. PATENT DOCUMENTS

| | | | | |
|---|---|---|---|---|
| 2,179,477 A * | 11/1939 | Berendsen | ............. | B60G 21/05 267/246 |
| 2,762,631 A * | 9/1956 | Entz | ............. | B60P 1/02 280/43.11 |
| 2,934,228 A * | 4/1960 | Hillberg | ............. | B62D 63/06 414/458 |
| 2,990,966 A * | 7/1961 | Schramm | ............. | B60P 1/025 414/476 |
| 3,574,388 A * | 4/1971 | Stone | ............. | B60P 3/32 296/168 |
| 3,784,218 A * | 1/1974 | Stone | ............. | B62D 63/061 280/43.23 |
| 4,008,902 A * | 2/1977 | Dill | ............. | B60P 1/025 280/43.23 |
| 4,286,797 A * | 9/1981 | Mekosh, Jr. | ............. | B60G 5/00 280/149.2 |
| 4,372,572 A * | 2/1983 | Verschage | ............. | B62D 53/065 280/441.2 |
| RE32,736 E * | 8/1988 | Lovell | ............. | B60G 5/00 180/41 |
| 4,838,566 A * | 6/1989 | Baxter | ............. | B60G 5/00 180/209 |
| 4,900,055 A * | 2/1990 | Wright | ............. | B60G 5/00 280/124.169 |
| 5,013,056 A * | 5/1991 | Landoll | ............. | B60P 1/18 280/149.2 |
| 5,161,814 A * | 11/1992 | Walker | ............. | B60G 11/225 280/414.1 |

(Continued)

OTHER PUBLICATIONS

Advance Metalworking Co, Inc., retrieved from https://advancemetalworking.com on Jul. 7, 2021, p. 1.

(Continued)

*Primary Examiner* — Paul N Dickson
*Assistant Examiner* — Timothy Wilhelm
(74) *Attorney, Agent, or Firm* — Saliwanchik, Lloyd & Eisenschenk

(57) ABSTRACT

A system for positioning a trailer body with the trailer support surface at ground level. The system comprises one or more suspension systems for controlling the position of wheels on either side of the trailer body and a rotary tongue system that allows the trailer tongue to rotate relative to the trailer body.

35 Claims, 10 Drawing Sheets

(56) References Cited

U.S. PATENT DOCUMENTS

| | | | | |
|---|---|---|---|---|
| 5,195,764 | A * | 3/1993 | Schantz | B60G 5/04 280/43.22 |
| 5,887,880 | A * | 3/1999 | Mullican | B62D 63/061 280/43.18 |
| 5,975,828 | A * | 11/1999 | Weldy | B60P 1/08 414/484 |
| 6,135,700 | A * | 10/2000 | Collins | B60P 3/07 280/43.23 |
| 6,152,486 | A * | 11/2000 | Pierce | B60G 17/005 280/755 |
| 6,474,672 | B1 * | 11/2002 | Briscese | B60G 3/00 280/414.5 |
| 6,592,139 | B1 * | 7/2003 | Shanahan | B60P 1/027 280/414.5 |
| 6,702,310 | B2 * | 3/2004 | Browning | B60G 17/005 248/200 |
| 7,243,979 | B1 * | 7/2007 | Stene | B60P 1/027 296/163 |
| 7,401,804 | B1 * | 7/2008 | Rupp | B60P 1/027 280/43.1 |
| 7,503,414 | B2 * | 3/2009 | Pierce | B60G 9/003 180/209 |
| 7,534,083 | B2 * | 5/2009 | Trudeau | B60P 1/02 414/482 |
| 7,540,528 | B2 * | 6/2009 | Spainhower | B62D 63/061 280/415.1 |
| 7,618,227 | B2 * | 11/2009 | Smith | B60P 1/027 280/414.5 |
| 7,740,258 | B2 * | 6/2010 | Saieg | B62D 53/068 280/149.2 |
| 7,743,871 | B2 * | 6/2010 | Chien | B60G 17/01908 180/282 |
| 7,926,609 | B2 * | 4/2011 | Kusaka | B62D 21/155 180/232 |
| 8,267,410 | B1 * | 9/2012 | Stutz | B60G 11/225 280/6.151 |
| 8,272,829 | B1 * | 9/2012 | Rupp | B60P 1/027 414/485 |
| 8,317,215 | B2 * | 11/2012 | Quenzi | B60P 3/122 280/425.1 |
| 8,820,767 | B1 * | 9/2014 | Osborne | B60G 17/017 280/414.1 |
| 9,205,881 | B2 * | 12/2015 | Vandergon | B60P 3/341 |
| 9,340,087 | B2 * | 5/2016 | Atkinson | B60D 1/155 |
| 9,428,027 | B2 * | 8/2016 | Iliuta | B60P 1/027 |
| 9,623,780 | B2 * | 4/2017 | Pratt | B60P 3/1033 |
| 9,969,234 | B2 * | 5/2018 | Osborne | B60G 17/005 |
| 9,994,270 | B2 * | 6/2018 | Blevins | B60P 1/027 |
| 10,370,033 | B1 * | 8/2019 | Klein | B62D 53/068 |
| 10,654,534 | B2 * | 5/2020 | Kamm | B62D 63/061 |
| 11,021,199 | B2 * | 6/2021 | Linkletter | B62D 63/061 |
| 2005/0184485 | A1 * | 8/2005 | Timmermans | B62D 63/061 280/656 |
| 2006/0186616 | A1 * | 8/2006 | Rudiger | B60G 7/02 280/6.15 |
| 2007/0017715 | A1 * | 1/2007 | McCann | B60G 17/0523 180/24.02 |
| 2017/0057577 | A1 * | 3/2017 | Blevins | B60P 1/027 |
| 2018/0215302 | A1 * | 8/2018 | Reid | B60P 1/08 |

OTHER PUBLICATIONS

Air-tow Trailers, retrieved from: https://airtow.com, Sep. 10, 2017, p. 1.

Drop Deck Depot, retrieved from https://dropdeckdepot.com on Jul. 7, 2021, p. 1.

Heimann Fahrzeugbau GMBH & Co. KG, retrieved from https://heimann-fahrzeugbau.de on Jul. 7, 2021, p. 1.

Triple L Trailers, retrieved from https://www.triplel.com on Jul. 7, 2021, pp. 1-3.

\* cited by examiner

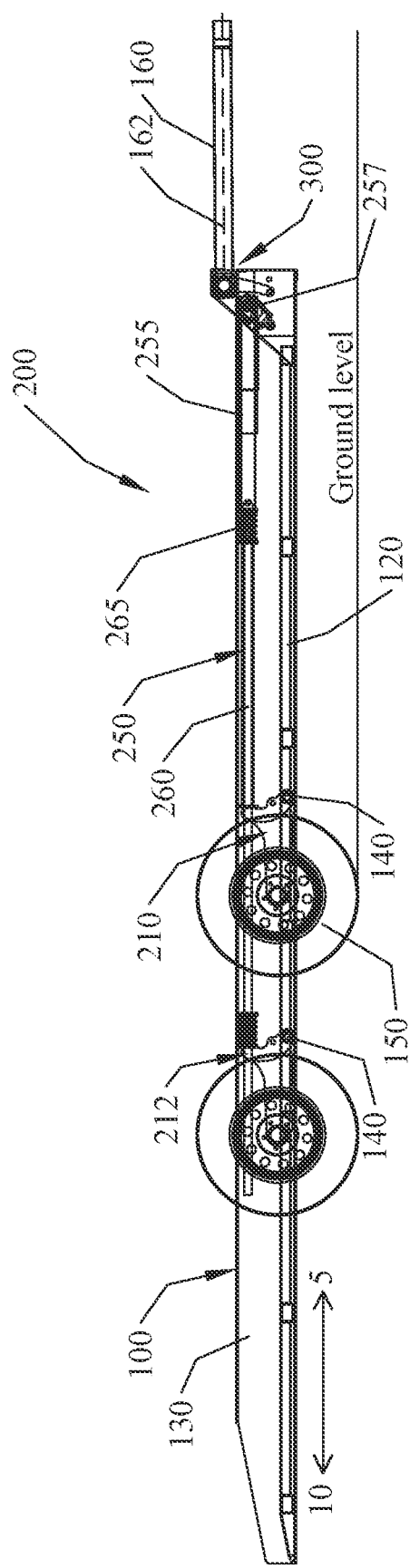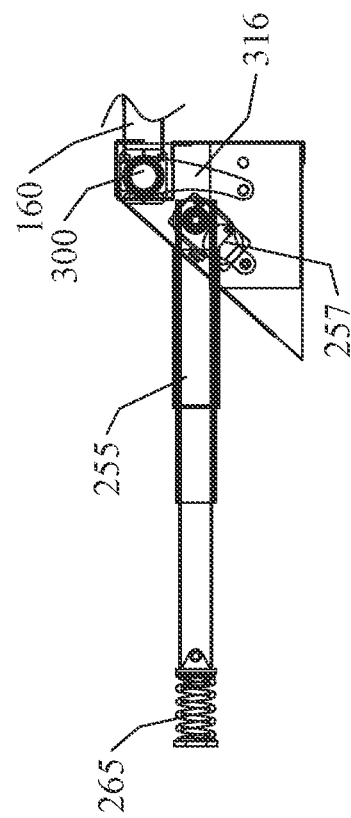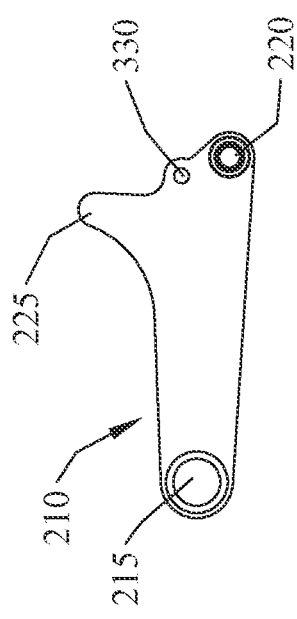

SUSPENSION SYSTEM AND ROTARY TONGUE LEVER SYSTEM FOR USE WITH A TOWABLE TRAILER

BACKGROUND OF INVENTION

Trailers are used to haul material and equipment behind a vehicle. They can be small, flat-bed utility trailers with single axle, large multi-axle heavy equipment haulers, and variations therebetween. Regardless of the size of the trailer, the carry load must be placed on the bed or load support surface of the trailer. This is often accomplished by either stepping up onto the trailer or attaching a ramp to the edge of the trailer so the carry load can be carried or driven up the ramp. The length of a ramp can depend on the height of the trailer bed and the material or equipment being loaded onto the trailer. Navigating a ramp can be dangerous and time-consuming and the ramp is usually stored or transported on the trailer to be used when unloading the trailer.

There is a need for a trailer with a load support surface that can be lowered to avoid stepping up onto the trailer or the need for a ramp. Ideally, the load support surface can be lowered completely to ground-level, so that a carry load can be walked or driven directly onto the load support surface. It can be particularly beneficial if the load support surface can be lowered manually or with conventional tools.

BRIEF SUMMARY

The problem of loading a trailer is solved by a suspension system that lowers the trailer support surface, on which material and equipment is placed for towing, to at or about ground level. Embodiments of a suspension system of the subject invention have a pivoting apparatus to which a wheel of the trailer can be attached. The trailer support surface can be lowered to at or about ground level with the pivot apparatus. A rotary tongue system can be used to rotate the trailer tongue on the trailer, which allows the trailer support surface to be lowered fully to at or about ground level. The rotary tongue system can operate in cooperation with the suspension system and in certain embodiments, can be incorporated with the suspension system. Advantageously, the rotary tongue system allows the tongue of the trailer to remain attached to a towing vehicle while the trailer support surface is lowered and raised with the pivot apparatus.

The suspension system can include a rocker arm that pivots the wheel attached thereto up and down, which allows the trailer support surface to lower to at or about ground level. A reciprocating arm of the suspension system can be used to rotate the rocker arm and can include a linear actuator that exerts force against the rocker arm to maintain the trailer support surface above ground level when towing. The rotary tongue system includes a tongue lever that can be used to allow the trailer tongue to be angled when the trailer support surface is at or about ground level or can be used to secure the tongue in a horizontal, towing position when the trailer support surface is above ground level. Advantageously the rotary tongue system can be operated independently of the suspension system or it can be operably attached to the suspension system so they two systems can operate simultaneously.

BRIEF DESCRIPTION OF DRAWINGS

In order that a more precise understanding of the above recited invention can be obtained, a more particular description of the invention briefly described above will be rendered by reference to specific embodiments thereof that are illustrated in the appended drawings. The drawings presented herein may not be drawn to scale and any reference to dimensions in the drawings or the following description are specific to the embodiments disclosed. Any variation of these dimensions that will allow the subject invention to function for its intended purpose are considered to be within the scope of the subject invention. Thus, understanding that these drawings depict only typical embodiments of the invention and are not therefore to be considered as limiting in scope, the invention will be described and explained with additional specificity and detail through the use of the accompanying drawings in which:

FIG. 1A is a left side elevation view of an embodiment of a system for lowering a load support surface of a towable trailer to ground level that includes embodiments of both a suspension system and a rotary tongue system, according to the subject invention. Also shown is an embodiment of an expanded suspension system that includes a tandem rocker arm and tandem strut. In this view, the trailer support surface is above ground level.

FIG. 1B illustrates an embodiment of a rocker arm of the suspension system shown in FIG. 1.

FIG. 1C is an enlarged view of the proximal end of a towable trailer having embodiments of a suspension system and rotary tongue system, according to the subject invention.

In this view, the rocker arms are shown in a position that would raise the trailer support surface above ground level.

Figure 8:
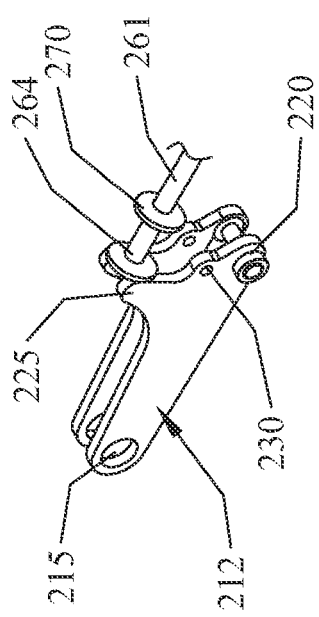

FIG. 8 is a left side perspective view of an embodiment of tandem rocker arm and a partial view of a tandem strut with a space for receiving a passive shock absorber.

Figure 9:
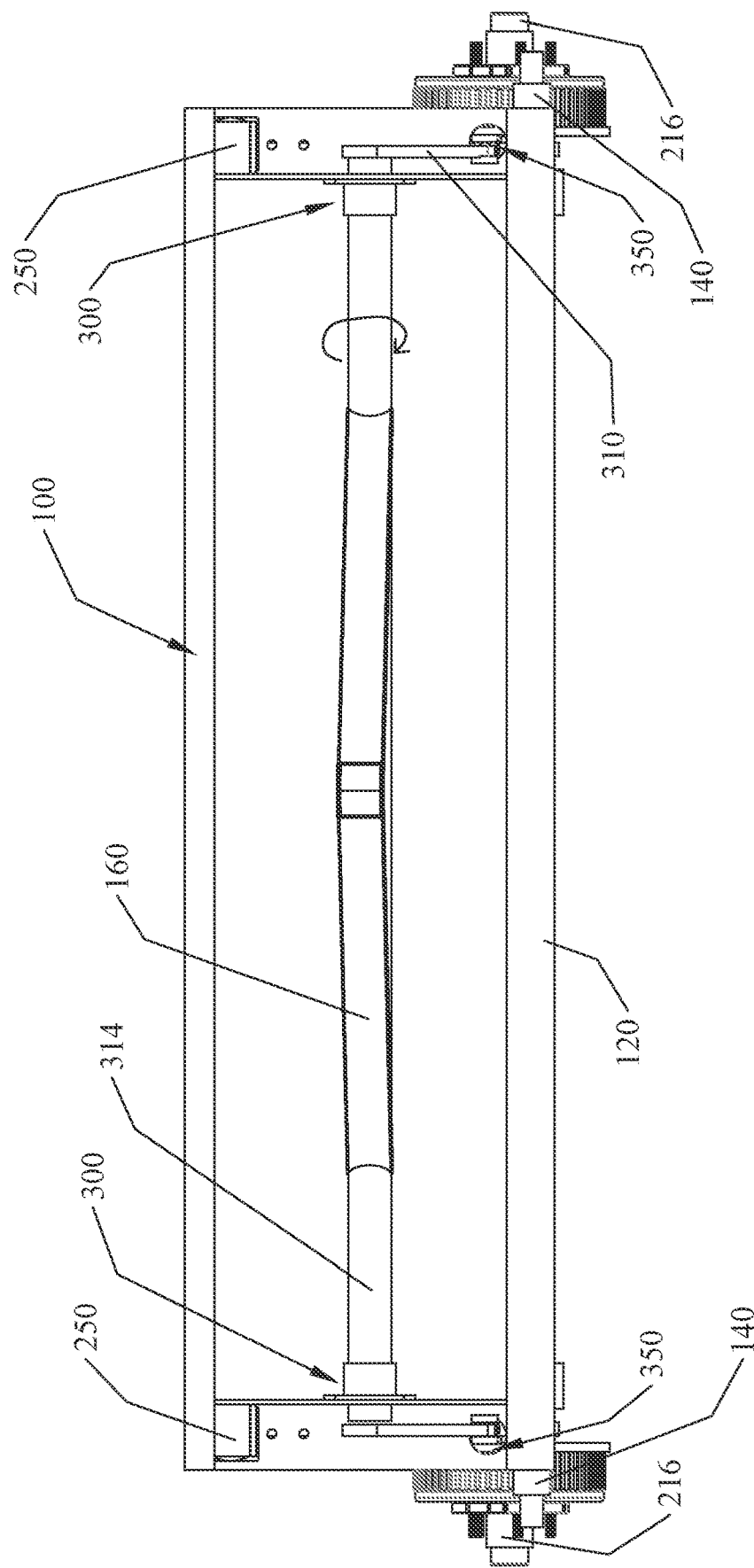

FIG. 9 is a front elevation view of an embodiment of a rotary tongue system, according to the subject invention. In this view, the trailer tongue is shown at the horizontal position and the suspension system in the position to raise the trailer support body above ground level.

Figure 10:
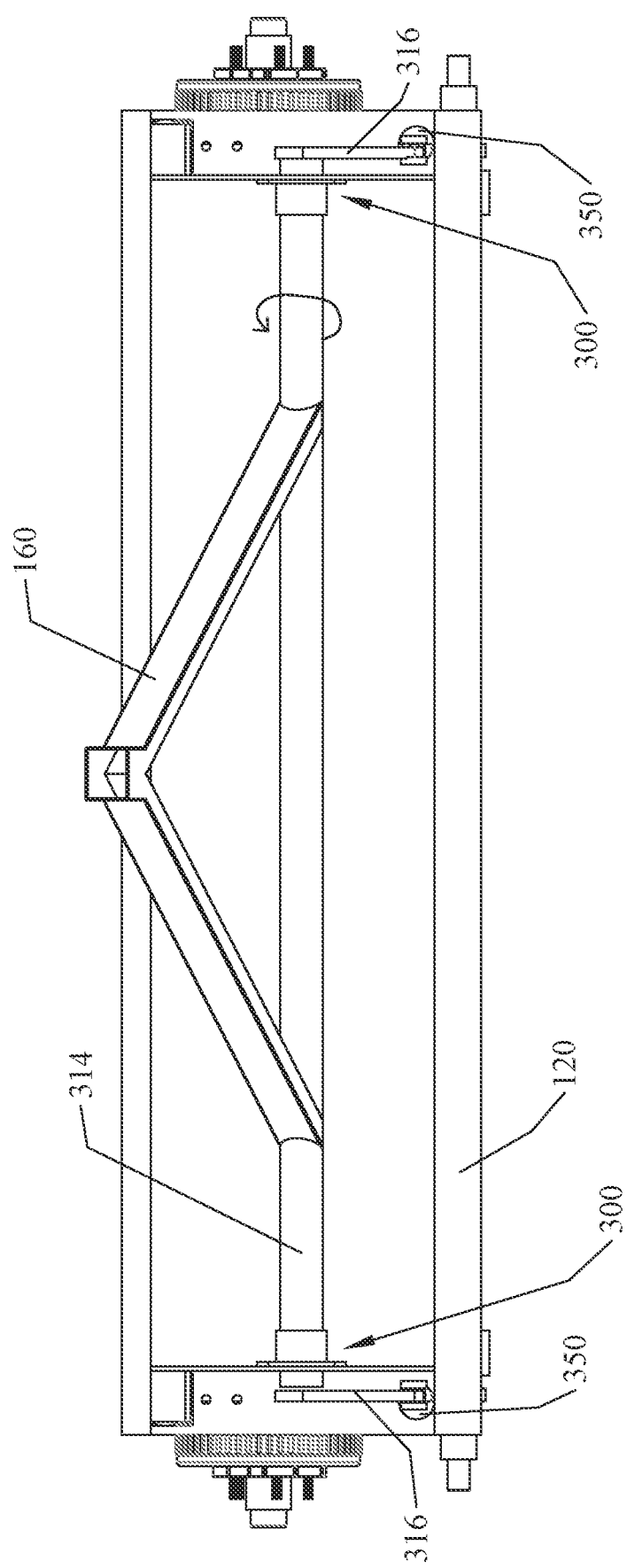

FIG. 10 is a front elevation view of an embodiment of a rotary tongue system, according to the subject invention. In this view, the trailer tongue is shown at an angle that allows the suspension system to lower the entire trailer support surface to be at ground level.

DETAILED DISCLOSURE

The subject invention provides a system useable on a trailer for towing behind a vehicle, where the system can be used to raise and lower the trailer body to put the trailer load support surface at ground level. More specifically, the subject invention provides embodiments of a system that includes a suspension system and a rotary tongue system that allow the load support surface of a trailer body to be lowered to ground-level and raised to a towing level.

Advantageously, the suspension system and rotary tongue system can be configured to be operated manually or with conventional tools. Alternative embodiments include a hydraulic or pneumatic system for operating the suspension system.

The following description will disclose that the subject invention is particularly useful in the field of trailers that are towed behind a vehicle. In particular, the suspension system and rotary tongue system embodiments of the subject invention can be useful with towable trailer that can be, but are not required to be, disconnected from the towing vehicle. While the subject application describes, and many of the terms herein relate to, towable trailers with a trailer body, the subject invention can be utilized with any load support surface on wheels or other supports where it can be desirable to lower the load support surface.

The term "wheel" is used herein merely for literary convenience. A wheel can include a tire and any components necessary to support the tire on an axle.

The term "ground level" as used herein refers to any surface to which the load support surface of a towable trailer can be lowered that is below the maximum towable height of the load support surface necessary for towing. In some instances ground level can be the same level as the bottom of a wheel on the trailer. In other instances, ground level can be any point above the level of the bottom of a wheel, but lower than the maximum towable height of the load supporting surface of the trailer. Thus, ground level refers to any level to which the load support surface is lowered with a suspension system of the subject invention.

As used herein, and unless otherwise specifically stated, the terms "operable communication," "operable connection," "operable attachment," "cooperatively engaged" and grammatical variations thereof mean that the particular elements are connected in such a way that they cooperate to achieve their intended function or functions. The "connection," "attachment," or "engagement" may be direct, or indirect, physical, or remote.

Reference is also made throughout the application to the "proximal end" or "proximal direction" and "distal end" or "distal direction." As used herein, the proximal end or proximal direction is that end that approaches or is nearest to a vehicle towing a trailer of the subject invention. For example, the tongue of a trailer is at the proximal end of the trailer body. Conversely, the distal end or distal direction is that end furthest from a vehicle towing a trailer of the subject invention. For example, the wheels of the trailer are distal to the suspension system.

The term "substantially," as used herein, refers to the complete or nearly complete extent or degree of an action, characteristic, property, state, structure, item, or result. For example, an object that is in "substantially" a given position including, but not limited to, vertical, horizontal, or adjacent to or aligned with another object, would mean that the object is either completely in that position or nearly completely in that position. For another example, an object that moves in a "substantial" direction, including but not limited to proximal to distal, up to down, or towards or away from another object would mean that the object either completely or nearly completely moves in that direction. The exact allowable degree of deviation from absolute completeness may in some cases depend on the specific context. However, generally speaking, the nearness of completion will be so as to have the same overall result as if absolute and total completion were obtained.

Additionally, the terms "about" or "approximately," as used herein, are defined as at least close to a given value or either end of a range as is necessary to still perform as described and to cover manufacturing variances, equipment tolerances, and normal variances in material, as understood by those skilled in the art.

Furthermore, as used in the specification and in the claims, the singular for "a," "an" and "the" include plural referents unless the context clearly dictates otherwise.

The figures and descriptions of the present invention have been simplified to illustrate elements that are relevant for a clear understanding of the invention, while eliminating, for purposes of clarity, other elements that may be well known. Those of ordinary skill in the art will recognize that other elements may be desirable and/or required in order to implement the present invention.

Reference will be made to the attached Figures on which the same reference numerals are used throughout to indicate the same or similar components. With reference to the attached Figures, which show certain embodiments of the subject invention, it can be seen that the subject invention comprises a system 50 for lowering the load support surface 120 of a trailer body 110 to ground level that includes a suspension system 200 and a rotary tongue system 300 that can be utilized with a towable trailer 100 with a trailer body 110 that can include a load support surface 120 and a sidewall 130. The suspension system can be operably attached to the trailer to the trailer with pin 140 that allows a rocker arm 210 of the suspension system 200 rotate about the pin. A reciprocating arm 250 can rotate the rocker arm, which can raise and lower at least one wheel 150 on a side of the towable trailer. Raising the one or more wheels can simultaneously cause the trailer body to move towards ground level. Conversely, lowering the wheel can cause the load support surface to be raised above ground level. The suspension system can include a rocker arm 210, which is pinned to the trailer body, and can be controlled by a reciprocating arm 250 that pivots the rocker arm 210 to raise and lower the wheel. A rotary tongue system 300 can optionally control vertical rotation of a trailer tongue 160 relative to the trailer body, allowing the load support surface to be lowered while the trailer remains attached to a towing vehicle. The rotary tongue system can operate in cooperation with, but independent of the suspension system. Alternatively, the rotary tongue system can operate in cooperation with and be integrated with the suspension system. In certain embodiments, the rotary tongue system includes a stabilizer arm 350 that can be operably connected to the rocker arm and operates simultaneously with the suspension system to control vertical rotation of the trailer tongue 160. Each of these general components can have one or more sub-components, which will be discussed in detail below.

The suspension system 200 of the subject invention can be advantageously utilized with a towable trailer 100. The towable trailer can be removably or permanently attached to a vehicle that tows the trailer. Devices and methods of attachment of trailers to a towing vehicle are known in the art and will not be discussed in detail here. Preferably, the removable or permanent attachment provides multiple degrees of freedom of rotation to the trailer. A lever system 300 can provide additional range of rotation, particularly vertical rotation to facilitate movement of the trailer body to ground level.

A towable trailer 100 with a suspension system 200 of the subject invention can have a load support surface 120 with at least one sidewall 130 on which a suspension system can be mounted. The suspension system operates by controlling the position of one or more wheels 150 on each side of the trailer, relative to the load support surface. In one embodiment, the position of at least one wheel on a trailer is controlled by a suspension system of the subject invention. In a more preferred embodiment, the position of at least one wheel on each of opposite sides of a trailer is controlled by a suspension system of the subject invention.

A suspension system 200 of the subject invention can control the position of a wheel 150 with a rocker arm 210 that can be rotated to change the position of the wheel relative to the load support surface 120. FIGS. 1A, 1B, 4, and 6B show non-limiting examples of rocker arms that can be utilized with embodiments of the subject invention. In one embodiment, a rocker arm is a rigid construct with three points of attachment: the axle point 215, the pivot point 220, the reciprocation point 225, and, optionally, the stabilizer point 330. In one embodiment, the first three points of attachment form a substantially triangular configuration. In a further embodiment, the pivot point and reciprocation point are proximal 5 to the axle point, which can be the most distal point of the suspension system. The stabilizer point can be located anywhere on the rocker arm and is the point where the stabilizer arm 350 operably attaches to the rocker arm. In one embodiment, the stabilizer point is located substantially between the pivot point and the reciprocation point.

Figure 2A:
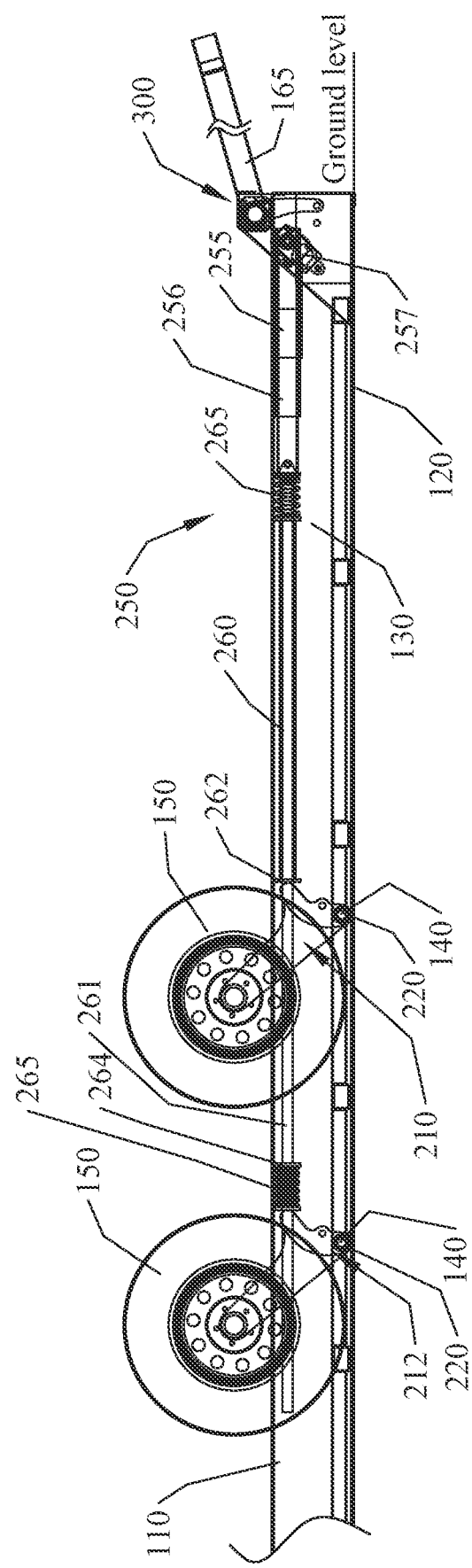
FIG. 2A is a left side elevation view of a system for lowering a load support surface of a towable trailer that includes embodiments of both a suspension system and a rotary tongue system according to the subject invention, arranged on a towable trailer. Also shown is a tandem rocker arm and tandem strut. In this view, the trailer support surface is at ground level.
Figure 3:
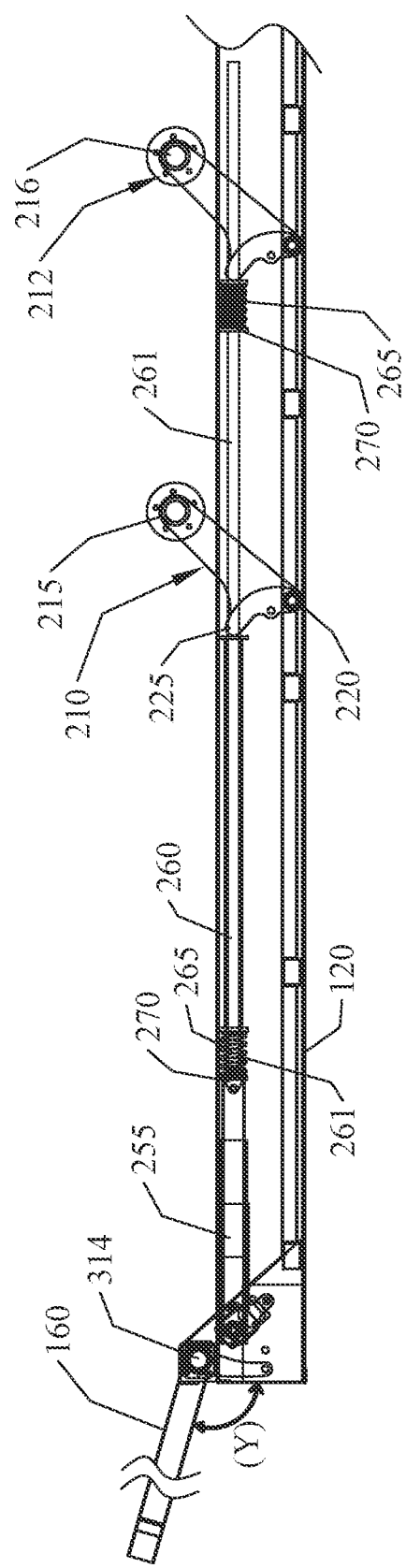
FIG. 3 is a right side elevation view of embodiments of a suspension system and a rotary tongue system according to the subject invention, arranged on a towable trailer. In this view, the wheels are not shown on the trailer and the trailer support surface is at ground level. A tandem rocker arm and tandem strut are also seen in this view.
Figure 5:
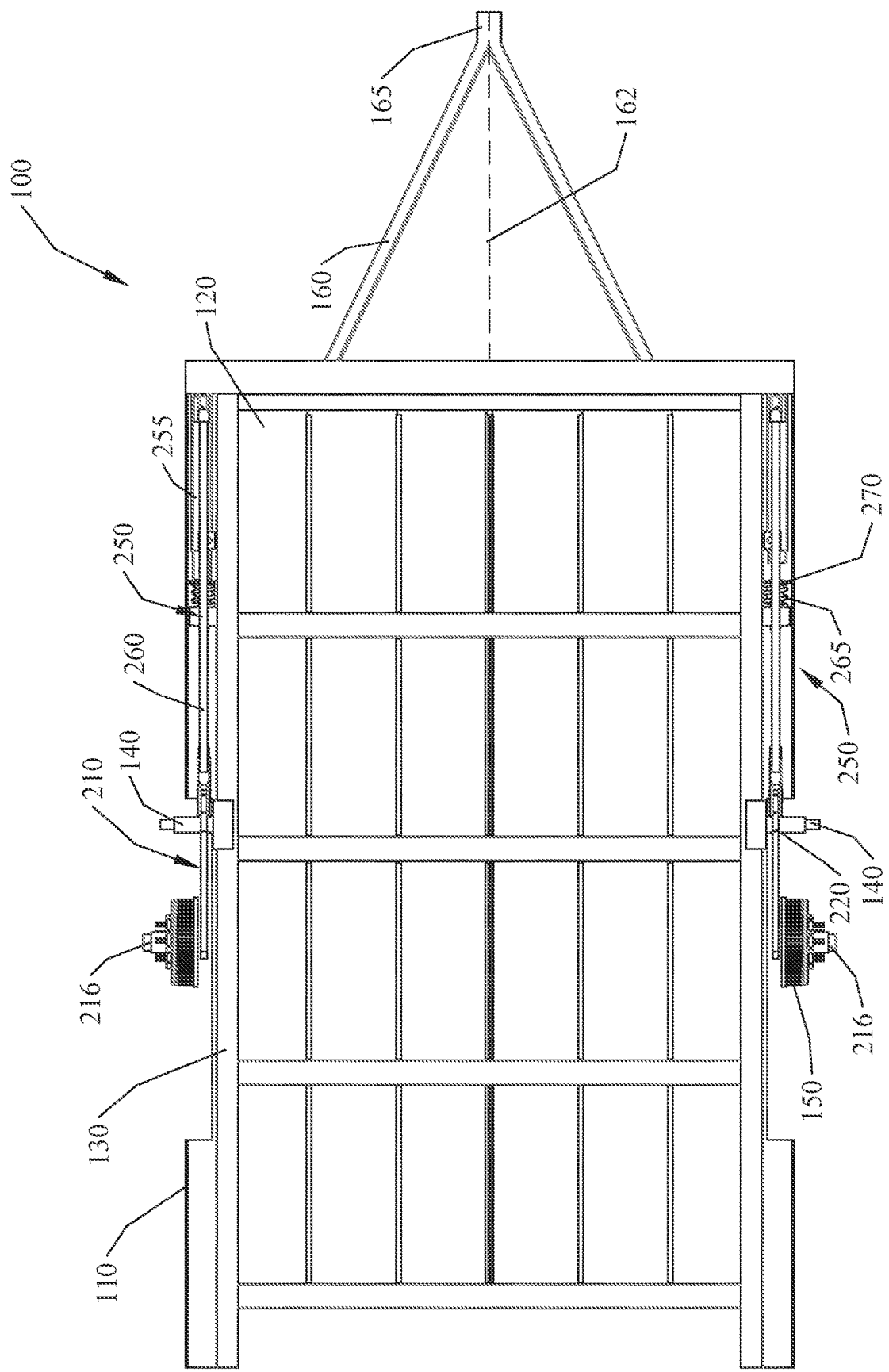
FIG. 5 is a top plan view of a towable trailer on which a system for lowering the trailer support surface to ground level includes a suspension system and rotary tongue system, according to the subject invention, arranged thereon. Also shown in this view is a forked trailer tongue with more than one attachment to the rotary bracket.

The axle point 215 of a rocker arm 200 can support and allow rotation of a wheel 150, as shown, for example, in FIGS. 2A and 6. In one embodiment, a truncated axle 216 is mounted at the axle rotation point for attachment of a wheel, one example of which is shown in FIGS. 3, 5, and 9. A pivot point 220 is the point around which the rocker arm is rotated to control the position of the wheel relative to the load support surface. The pivot point on a rocker arm 210 can be rotatably attached to the trailer body 110. In one embodiment, a pin 140 attaches the rocker arm to the trailer at the pivot point, one example of which is shown in FIG. 5.

Figure 4:
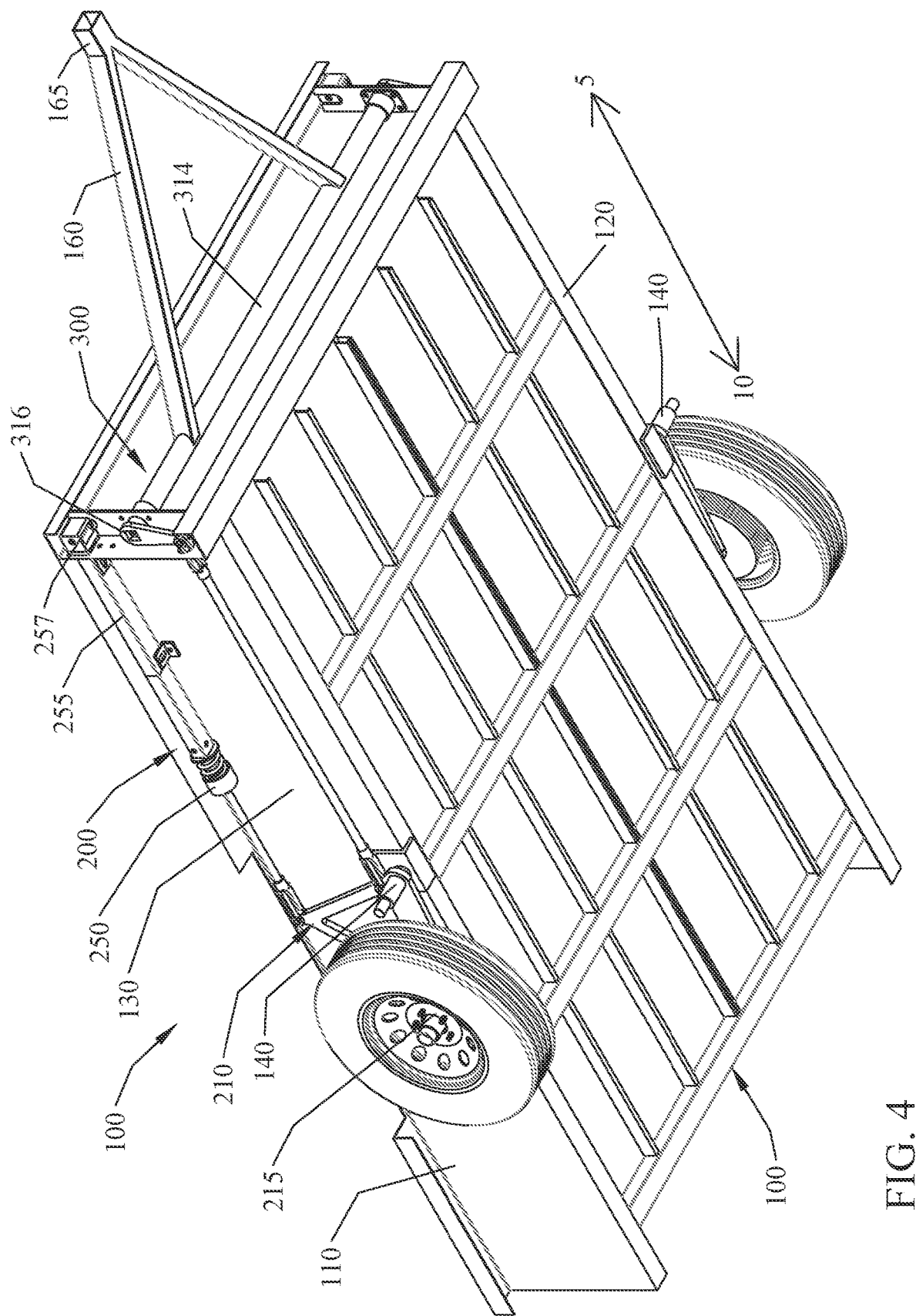
FIG. 4 is a bottom perspective view of a towable trailer with embodiments of a suspension system and a rotary tongue system according to the subject invention. Shown here is an alternative embodiment of a rocker arm positioning the trailer support surface above ground level with the trailer tongue at the horizontal position.
Figure 6A:
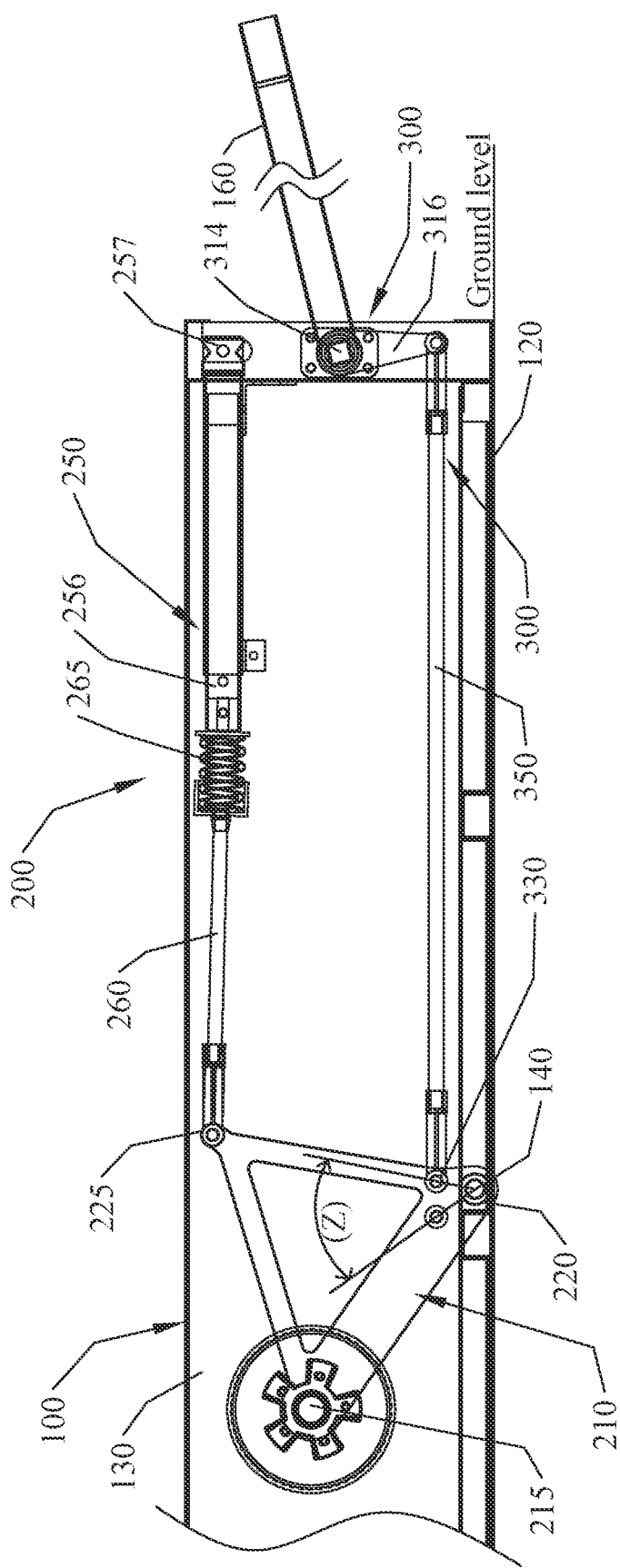
FIG. 6A is a left side elevation view of an embodiment of a suspension system and a rotary tongue system according to the subject invention, arranged on a towable trailer. Shown here is an alternative embodiment of a rocker arm positioning the trailer support surface at ground level with the trailer tongue angled.

The reciprocation point 225 can be the point where force is applied to the rocker arm 210 to control or change the position of the wheel attached to the axle point 215. The reciprocation point can move or reciprocate distally and proximally depending on the force applied. In one embodiment, the reciprocation point is arranged above the pivot point whether the wheel is raised or lowered. Thus, the axle point 215 and the reciprocation point 225 rotate relative to the pivot point 220, which has a fixed location on the trailer body 110. FIGS. 1A and 4 illustrate embodiments of rocker arms in a position that raises the load support surface 120 of the trailer above ground level, so the trailer can be towed. FIGS. 2A and 6A illustrate embodiments of the rocker arms in a position that lowers the load support surface 120 of the trailer to ground level. In one embodiment, when the bottom of the wheel and/or a tire thereon are on a level with or are above the load support surface, the load support surface is lowered to the level of the surface on which the wheel and/or the tire were supported, e.g., ground level, as demonstrated in FIGS. 2A and 6A.

In one embodiment, the rocker arm 210 rotates freely at the pivot point 220. This allows the wheel to also swing substantially vertically, such that when the reciprocation point is not forced or reciprocated distally, the load support surface lowers to ground level. Stated another way, a lack of force or cessation of force being applied to the reciprocation point allows the reciprocation point to move proximally, so the load support surface 120 of the trailer 100 will automatically or by default drop to ground level, which is demonstrated in FIGS. 1A and 6A. Thus, to maintain the towable trailer in a towable configuration, with the load support surface raised, force can be applied to the reciprocation point 225.

Figure 6B:
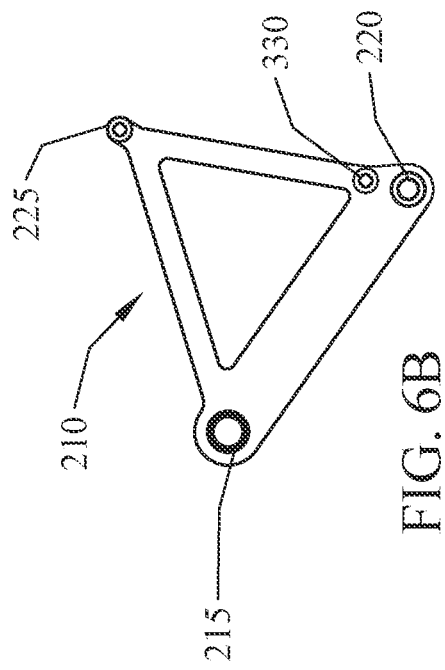
FIG. 6B is a front elevation view of the alternative rocker arm seen in FIG. 6A.

The rocker arm 210 can be rotated about the pivot point 220 with a reciprocating arm 250, which can apply the necessary force to the reciprocation point 225. A reciprocating arm can have a coupling end 264 that operably connects to, couples with, abuts, is adjacent to, or is otherwise in operable contact with the reciprocation point 225. For example, the reciprocating arm can be rotatably coupled to the reciprocation point, an example of which is shown in FIGS. 6A and 6B, or, alternatively, the coupling end can be pressed against the rocker arm at or near the reciprocation point 225, which is demonstrated in FIGS. 7 and 8. In general, a reciprocating arm can act by applying a distally directed force or distally pushing the rocker arm 200 at or about the reciprocation point 225 to rotate the rocker arm about the pivot point 220. Thus, the reciprocating arm moves or applies force in a substantially proximal 5 to distal 10 direction to force the trailer body up while simultaneously pushing the wheel down.

In one embodiment, a reciprocating arm can have a linear actuator 255 in operable connection with at least one strut 260. A linear actuator can translate a force to and advance a strut in at least a distal direction. As described above, when force is applied to the reciprocation point 225, a wheel is force down and the load support surface 120 of the towable trailer 100 is raised above ground level. In one embodiment, to maintain the load support surface above ground level, the strut of the reciprocating arm 250 is pushed against the reciprocation point 225 by the linear actuator. FIGS. 1A and 4 show non-limiting examples of a reciprocating arm applying force to maintain the load support surface 120 above ground level. Conversely, when the reciprocation point is allowed to move proximally, by the release of or cessation of force applied thereto, the rocker arm will pivot so that the trailer load support surface moves to ground level. Thus, when the linear actuator is released or controlled to remove force against the reciprocation point, the wheels automatically raise and the load support surface automatically drops to or in the direction of ground level.

Figure 7:
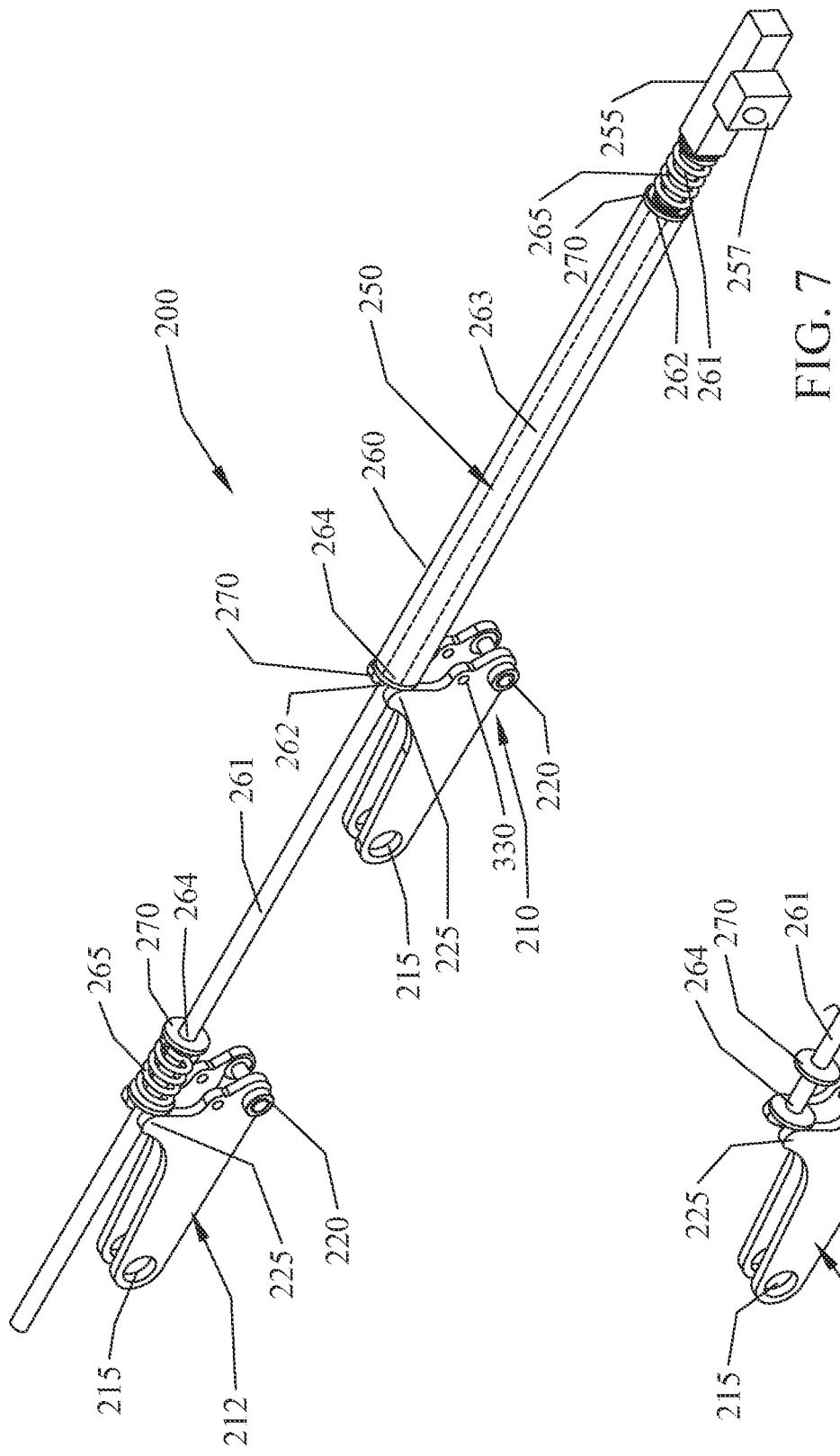
FIG. 7 is a left side perspective view of an embodiment of a suspension system, according to the subject invention, expanded to include a tandem rocker arm and a tandem strut.

A suspension system can have a single rocker arm, such that force can be applied to a single reciprocation point, which is demonstrated, for example, in FIGS. 5 and 6A. Alternatively, a suspension system can have paired rocker arms, such that force can be applied to two side-by-side reciprocation points. The rocker arms can be distanced from each other to allow for expansion of the suspension system, which is discussed in more detail below. FIGS. 7 and 8 illustrate non-limiting examples of paired rocker arms.

Linear actuators are known to those with skill in the art and can include any of a variety of mechanical actuators, hydraulic actuators, pneumatic actuators, and combinations thereof. By way of non-limiting examples, a linear actuator can be a hydraulic or pneumatic piston, such as a single action or dual action cylinder piston. Other examples of a linear actuator that can be utilized with a reciprocating arm are a mechanical jack or press, such as a rack and pinion, ratchet, or screw actuator that moves a rod, bar, or arm. As the ordinary artisan can readily envision, other types of linear actuators can be used to move, translate, or create a reciprocating motion to a reciprocating arm.

In a specific embodiment, the linear actuator utilized with embodiments of the subject invention is mechanical, such that the linear actuation can be controlled with a gear mechanism 257 that advances or retracts a telescoping arm 256 to move the strut. For example, a gear mechanism can be operated by a hand-crank that advances a screw, block, spindle, or similar rotatable mechanism. By way of another example, the gear mechanism can include a gear box that can be operated by an electric drill to rotate a screw, block, spindle, or similar rotatable mechanism with gears to advance the linear actuator. FIG. 1C shows a non-limiting example of a gear box incorporated with a linear actuator.

Figure 2B:
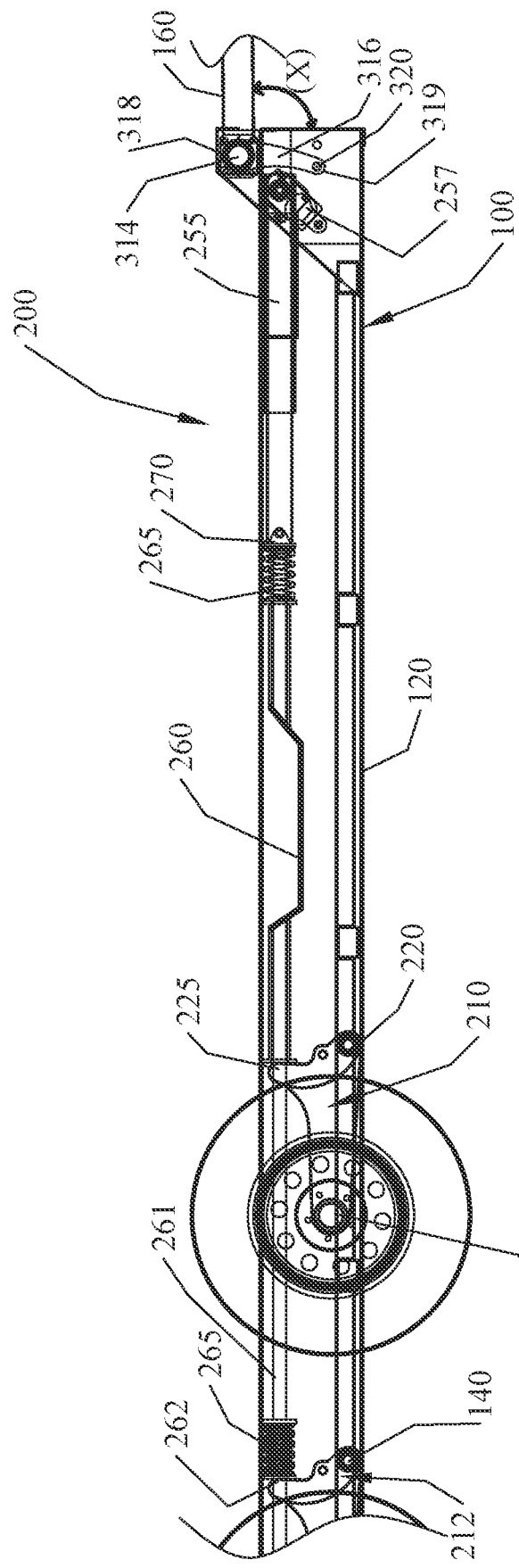
FIG. 2B is an enlarged partial view of the suspension system and rotary tongue system according to the subject invention, arranged on a towable trailer. In this view, the trailer support surface is above ground level.

In a further embodiment, a reciprocating arm 250 includes a strut 260 in operable contact with the linear actuator. A strut can be a rigid construct with an actuator end 262 nearest to or in operable connection with the linear actuator 255 and a coupling end 264, mentioned above, that is nearest to or in operable connection with the reciprocating point 225 of the rocker arm 210. The strut can have a longitudinal length between the actuator end 262 and the coupling end 264, which can, but is not required to be, linear. For example a strut can be curved, bent, or otherwise non-linear along at least a portion of the longitudinal length, an example of which is shown in FIG. 2B. In a specific example, shown in FIGS. 2A, 4, and 6A, the strut is a rigid, linear rod or pipe. A strut can further include one or more braces 270 fixedly arranged anywhere along the longitudinal length of the strut, which can include either end of the strut. A brace can provide a surface against which force from the linear actuator 255 is applied to or translated to the strut and/or through the entire suspension system. In one embodiment, the linear actuator applies force to the actuator end to push the coupling end of the strut against the reciprocation point 225 to rotate the rocker arm. In one embodiment, a brace is fixedly attached at or near the actuator end to provide a surface against which the linear actuator can apply force to the strut. This applied force can be translated through the strut to pivot the rocker arm distally 100 and swing the bottom of the wheel 150 at least partially below the load support surface 120, thereby allowing the trailer to be towed. FIG. 2B shows an example of a brace fixedly attached at the couple end to facilitate contact with the reciprocation points of paired rocker arms.

The components of a suspension system 200 of the subject invention can be supported on the side of a trailer, which can facilitate control of one or more wheels on the side of the trailer. For the sake of clarity and description of the embodiments herein, the Figures show the suspension system components on the outside of the trailer sidewalls. An ordinary person of skill in the art will recognize that one or more of the components could be arranged on another area of the trailer, such as the interior or opposite side of the trailer sidewall without departing from the scope of the invention.

In a particularly advantageous embodiment, the suspension system includes at least one shock absorber 265 on the reciprocating arm 250. A shock absorber can be positioned between the linear actuator 255 and the reciprocation point 225. Shock absorbers are known in the art and are used to inhibit the effects of uneven terrain when towing the trailer by buffering motion of the wheel. In one embodiment, a shock absorber 265 is arranged between the linear actuator 255 and the strut 260 of a reciprocating arm 250. In an alternative embodiment, a shock absorber is arranged between the strut and the reciprocation point on a rocker arm. In a further embodiment, the shock absorber is arranged between or abuts a brace 270 on the reciprocating arm, such as shown in FIGS. 2B and 5. Force applied to the strut by the linear actuator can be translated through the shock absorber to the strut and/or the reciprocation point, depending on where the shock absorber is located on the reciprocating 250. Any of a variety of shock absorbers can be utilized with the subject invention. In one embodiment, a passive shock absorber, such as, for example, a spring or bump stop, is arranged between the linear actuator and the strut, which is shown, for example, in FIGS. 2B and 6. In an alternative embodiment, which is not shown in the Figures, but would be understood by a person of skill in the art, a pneumatic or hydraulic shock absorber can be utilized on a reciprocating arm. In a still further embodiment, the linear actuator 255 can operate as a shock absorber. By way of example, a hydraulic or pneumatic linear actuator could be used with the reciprocating arm to apply force to the strut and can also operate as a shock absorber.

Trailers for hauling heavier loads often have multiple axles to support additional wheels for load support. The suspension system 200 of the subject invention can be effectively expanded to support and control additional and wheels 150. In one embodiment, the suspension system is expanded to include at least one tandem rocker arm 212 and at least one tandem strut 261. The characteristics and features of a tandem rocker arm 212 and tandem strut 261 can be the same as described for a rocker arm 210 and strut 260. In one embodiment, the tandem rocker arm and tandem strut have substantially the same configuration as a rocker arm 210 and strut 260, but are arranged distal 10 to the rocker arm 210 and strut 260 on the trailer body 110. The tandem rocker arm can also have a truncated axle 216 arranged at or near the axle point 215 to support a wheel 150 thereon. In a specific embodiment, the linear actuator 255 controls the pivotal motion of the tandem rocker arm and tandem strut, such that additional linear actuators can be incorporated with the suspension system 200 but are not required. The tandem rocker arm 212 can be arranged sufficiently distal 10 to the rocker arm 210 to allow the tandem rocker arm to pivot proximally 5 and distally 10 with a wheel thereon. FIGS. 1A and 2A illustrate non-limiting examples of a tandem rocker arm and a tandem strut arranged on a trailer body, so that an axle and wheel attached thereto are raised and lowered simultaneously with the more proximal rocker arm and rocker strut.

In one embodiment, the proximal to distal motion of the strut 260 and a tandem strut 261 is substantially colinear with the motion of the linear actuator. In other words, the linear motion of the linear actuator provides a force that is translated in substantially the same linear direction to the reciprocation point 225 of both the rocker arm 210 and the tandem rocker arm 212. This is demonstrated in FIG. 7. This can allow the linear actuator to simultaneously pivot both the rocker arm and the tandem rocker arm.

The tandem strut 261 can be arranged distal to the strut 210. In one embodiment, the tandem strut extends from the coupling end 264 of the strut, as shown, for example in FIG. 7. In one embodiment, the tandem strut is fixedly attached to the coupling end of the strut, such that the strut and the tandem strut are a single, rigid unit. This embodiment can be generally understood from FIG. 7, which shows an actuator end 262 extending from a coupling end 264 of a strut. In an alternative embodiment, a strut is a pipe with a bore 263 therethrough and the tandem strut is a pipe, rod, or similar device that extends from the linear actuator 255, through the bore of the strut, and extends out from the coupling end 264 of the strut. Thus, with this embodiment, the actuator end 262 of the tandem strut can have a more direct operable attachment to the linear actuator. FIG. 7 illustrates one example of a tandem strut extending through the bore of a strut. With this embodiment, the linear actuator can simultaneously exert force against both the strut and the tandem strut. The coupling end 264 of the tandem strut can be operably connected to, abut, or otherwise contacts the reciprocation point 225 on the tandem rocker arm 212, which is shown, for example, in FIG. 8. When the linear actuator exerts a distal force, the strut and the tandem strut can simultaneously push against the respective reciprocation points 225 on the respective rocker arm 210 and the tandem rocker arm 212, which can push the wheels downward and simultaneously cause the load support surface to move upwards. It was mentioned above that the suspension system can have a single rocker arm or paired rocker arms. While paired rocker arms can be utilized with a single wheel, they can be particularly advantageous with an expanded suspension system that includes two or more wheels.

In one embodiment, a suspension system has paired rocker arms 210 and paired tandem rocker arms 212. In a further embodiment, a tandem strut 261 can extend from the linear actuator, as described above, and between paired rocker arms to terminate in a coupling end 264 that applies force against the paired reciprocation points 225 on paired tandem rocker arms. FIGS. 2B and 7 illustrate one example of this embodiment.

As discussed above, there can be one or more shock absorbers 265 incorporated with a reciprocating arm 250. A tandem strut can also include one or more shock absorbers arranged anywhere along the longitudinal length. In one embodiment, a shock absorber is arranged between the reciprocation point 225 of a tandem strut and the coupling end 264 of the tandem strut. In a particular embodiment, a passive shock absorber, such as, for example, a spring or bump stop, is arranged between the reciprocation point and the coupling end, which is shown, for example, in FIGS. 2A and 7.

A tandem strut 261 that extends through a bore 263 of a strut can provide a beneficial structure for supporting one or more shock absorbers on a reciprocating arm. More specifically, a tandem strut with an actuator end 262 that is fixedly attached to the linear actuator 255 can provide a beneficial support for other components of the reciprocation arm. In a further embodiment, the strut 260 slides on a tandem strut that has an actuator end 262 fixedly attached to the linear actuator. In a further embodiment, the tandem strut supports one or more shock absorbers 265 arranged on the reciprocating arm 250. In a specific embodiment, the tandem strut supports one or more passive shock absorbers, such as a spring or bump stop. Because the tandem strut can extend the full longitudinal length of the suspension system, that is, from the linear actuator to at least the reciprocation point 225 of the tandem rocker arm 212, one or more shock absorbers 265 and associated braces 270 can be arranged in any beneficial location on the suspension system. FIGS. 7 and 8 illustrate embodiments of a suspension system 200 with a tandem strut 261 that extends distally 10 from the linear actuator 255, through the bore 263 of a strut 260, and to a tandem rocker arm 212. A shock absorber can be arranged at one or both of an actuator end 262 and at a coupling end 264 of one or both of a strut and a tandem strut. FIG. 7 illustrates a non-limiting example of a tandem strut 261 supporting a slidable strut 260 thereon and with a shock absorber 265 arranged at the actuator end 262 of the strut and a second shock absorber supported on the tandem strut at the coupling end 264 thereof. With this embodiment, the linear actuator applies force against both the tandem strut and the shock absorber of the strut, which translates to the tandem rocker arm and rocker arm, respectively, forcing the wheels down and raising the load support surface 120. As long as force is applied to the rocker arm and the tandem rocker arm, some portion of the wheels will remain below the load support surface and the shock absorbers will be tensioned against the rocker arm and the tandem rocker arm. When the wheels bounce or experience a jolt the axle points 215 can be pushed up, pivoting the reciprocation point proximally to temporarily compress the shock absorbers on the strut and the tandem strut.

A towable trailer can be rotatably connected to a vehicle. Conventional apparatuses employ a trailer with a tongue 160, with a single (FIG. 3) or double attachment (FIG. 5) to a trailer, which has a hitch coupler 165 at the proximal end that rotatably couples to a trailer ball on a vehicle. Ideally, when attached to the ball hitch the trailer body is substantially aligned with the body of the towing vehicle. When towed on an even surface the ball hitch will pull the trailer in a horizontal line from the ball hitch to the end of the trailer. There can be other apparatuses for connecting a towable trailer to a vehicle other than the typical ball hitch system, but a common characteristic is at least some rotation freedom around the point where the trailer tongue connects to the vehicle. The connection of the towable trailer to a vehicle typically requires at least 4-degrees of freedom, so the tongue and trailer can rotate horizontally and vertically. There are limits to such rotational freedom, as any ordinary person of skill in the art will understand. Conversely, the tongue and trailer can have an immovable connection, such that there is no rotation between the trailer tongue and the trailer body. When a suspension system 200 of the subject invention is utilized on a towable trailer, lowering the load support surface to ground level, a trailer tongue that is immovable relative to the trailer body can inhibit the proximal end of the load support surface 120 from reaching ground level.

A rotary tongue system 300 can be incorporated with the system 50 for lowering a trailer support surface to ground level, which has a suspension system 200, of the subject invention. A rotary tongue system can provide temporary rotational capability between the trailer body and the trailer tongue that allows the load support surface 120 of the trailer to lower fully to the ground level with the suspension system. Thus, the system 50 for lowering the load support surface to ground level can include both a suspension system and a rotary tongue system. A rotary tongue system can include a rotary tongue 312 and at least one tongue lever 316. The tongue lever can be used to secure the position of the rotary tongue for towing, by inhibiting rotation of the rotary tongue, and, when unsecured, allows the trailer to be dropped to ground level by allowing the rotary tongue to rotate. In certain embodiments, the tongue lever is secured with a tongue lever pin 325. In certain alternative embodiments, the rotary tongue system includes a stabilizer arm 330 that operates in concert or simultaneously with the suspension system to secure the tongue lever. FIG. 1C shows a non-limiting example of tongue lever.

The rotary tongue 312 of a rotary tongue system 300 can include a trailer tongue 160 having a proximal end 5 with conventional components for rotatable attachment to a towing vehicle. For example, the proximal end 5 of the trailer tongue can have components for connecting to a ball hitch. At the distal end 10 the trailer tongue can be immovably attached to a rotary bracket 314. A rotary bracket can be an elongated tube, rod, pipe, or the like that is arranged on the trailer to be perpendicular to the center of the tongue 162, as illustrated in FIGS. 2B, 5, 9 and 10. The trailer tongue 160 and the rotary bracket 314 form a rigid rotary tongue 312, which is shown, for example, in FIGS. 3, 6A, 9 and 10. The rotary bracket can be rotatably connected at or about the proximal end 5 of the trailer body 110, so that the rotary bracket can rotate proximally and distally or clockwise and counterclockwise along the longitudinal length, which is indicated, for example, in FIGS. 9 and 10. This can allow the fixedly attached trailer tongue of the rotary tongue to also move vertically. In one embodiment, the rotary tongue allows the distal end 10 of the trailer tongue 312 to follow or lower when the trailer support surface drops or lowers to ground level. In a further embodiment, the rotary tongue can remain attached to a towing vehicle when the load support surface is dropped or lowered to ground level. FIGS. 1A, 4, and 9 show embodiments of a rotary tongue in the position where the proximal end is connected to a towing vehicle and with the trailer support surface 120 above ground level. FIGS. 2A, 6A, and 10 show embodiments of a rotary tongue in the rotated position where the proximal end is connected to a towing vehicle and the trailer support surface is lowered or dropped to ground level.

It can be undesirable for the rotary tongue 312 to rotate when the trailer 100 is being actively towed. Thus, when the trailer support surface 120 is raised above ground level and prepared for towing, the rotary tongue can preferably be locked, so the trailer tongue 160 is in a horizontal position, examples of which are shown in FIGS. 4 and 9. In one embodiment, the rotary tongue system includes a tongue lever 316 fixedly attached to the rotary bracket. The tongue lever can be used to hold or secure the horizontal position of the trailer tongue 160 when the trailer support surface is raised above ground level, which can inhibit rotation of the rotary tongue. A tongue lever 316 can be arranged anywhere on a rotary bracket 314 that will allow the tongue lever to be held or secured to maintain a horizontal position of the trailer tongue. FIGS. 2A and 6A illustrate specific embodiments where a rotary bracket 314 extends to each side of the trailer body 110 and a tongue lever arranged on the exterior of the trailer body 110 on at least one end of the rotary bracket 314.

A tongue lever can have a rotary end 318 and a stabilizer end 319. The rotary end can be fixedly attached to the rotary bracket 314 and rotates with the rotary bracket. The stabilizer end is distanced from the rotary end and can be pinned, held, or otherwise secured to maintain the trailer tongue in a horizontal position. In one embodiment, a tongue lever has a stabilizer end with a pin hole 320 in which a tongue lever pin 325 is used to pin the tongue lever to the trailer body to maintain the trailer tongue position. Stated another way, the tongue lever 316 can be used to control the rotation of the rotary tongue. A tongue lever pin is not shown separately in the Figures, but would be readily understood by a person of ordinary skill in the art. For example, the trailer body 110 can have one or more openings, structures, or some combination thereof that the lever pin can engage with to secure the tongue lever position. FIGS. 2B and 3 show non-limiting examples of a tongue lever that can be pinned in place to secure the position of the trailer tongue either raised when the trailer support surface is at ground level or horizontal when the trailer support surface is raised. A line (X) drawn between the center of the rotary end 318 and the center of the stabilizer end 319 of the tongue lever 316, as shown in FIG. 2B, can form an angle with the trailer tongue 160 of at least 80°, 85°, 90°, 95°, 100°, 105°, 110°, 115°, 120°, and/or an angle between any two of the listed values.

When the rotary tongue rotates the distal end 10 of the trailer tongue towards ground level, to facilitate the entire trailer support surface 120 being dropped to ground level, the stabilizer end 319 of the tongue lever can rotate proximally 5, which is shown, for example, in FIG. 2A. Conversely, when the rotary tongue rotates the distal end 10 of the trailer tongue 160 upwards when the trailer support surface is raised above ground level, the stabilizer end can rotate distally 5, which is shown, for example, in FIG. 2B. With this embodiment, the rotary tongue system 300 is separate from and can be operated independent of the suspension system. The stabilizer end can be unpinned or otherwise allowed to move freely, which likewise can permit the rotary tongue to rotate. When the trailer support surface is lowered to ground level, the rotary tongue 312 can rotate, for example, counterclockwise, so the distal end of the tongue also moves towards ground level, which can allow the proximal end of the trailer support surface to reach ground level, while the trailer remains attached to the towing vehicle. Likewise, when the suspension system 200 is operated to raise the trailer support surface above ground-level for towing, the distal end of the tongue is raised until it is substantially horizontal, at which point the tongue lever can be secured so the trailer and rotary tongue are rigidly connected and ready for towing.

The rotary tongue 312 can move or rotate the distal end of the tongue downwards towards ground level, when the trailer support surface is lowered or dropped to ground level. This can position the tongue at angle (Y) relative to the horizontal position, as shown, for example, in FIG. 3. In one embodiment, the angle (Y) of the tongue relative to the horizontal is at least 8°, 9°, 10°, 11°, 12°, 13°, 14°, 15°, 16°, 17°, 18°, 19°, 20°, 21°, 22°, 23°, 24°, 25°, 26°, 27°, 28°, 29°, and/or 30° or a rotation capability between any two of the listed values.

In an alternative embodiment, the rotary tongue system 300 and the suspension system 200 are operably connected by a stabilizer arm 350. The stabilizer arm can secure the position of the tongue lever 316 when the trailer support surface is raised above ground level or lowered to ground level. In other words, the suspension system 200 can control the rotation of the rotary tongue 312. In one embodiment, a stabilizer arm has a distal end 10 that is rotatably attached to a rocker arm 210 at the stabilizer point 330 and a proximal end 5 that is rotatably attached to the stabilizer end 319 of the tongue lever 316. FIGS. 4, 6A, and 6B show non-limiting examples of a stabilizer arm operably connected to a stabilizer point on a rocker arm. In a further embodiment, the stabilizer arm is rigid, such that there is a rigid connection, preferably, with minimal hysteresis, between the rocker arm and the stabilizer end.

The distal end 10 of the stabilizer arm 350 can be rotatably attached at any point on the rocker arm 210 that will provide sufficient proximal motion to advance the proximal end 5 of the stabilizer arm against the tongue lever to rotate the trailer tongue. In one embodiment, the proximal end 10 of the stabilizer arm is attached to a rocker arm between the pivot 220 and the reciprocation point. In a more specific embodiment, the proximal end of the stabilizer arm is attached to the rocker arm at a distance from the pivot point of at least 2", 2.25", 2.5", 2.75", 3", 3.25", 3.5", 4", 4.25", 4.5", 4.75", 5", 5.25", 5.5", 5.75", and/or 6" or a distance between any two of the listed values. When the rocker arm rotates on the pivot point, the position of the proximal end of the stabilizer arm can move or rotate as well.

When the rocker arm is positioned so that the trailer support surface 120 is raised sufficiently for towing, the proximal end 10 of the stabilizer arm 350 can be at least partially distal to the pivot point. This position can pull the stabilizer end 319 of the tongue lever 316 in the distal direction, which can bring the tongue to a horizontal position. One example of this can be seen in FIG. 4A. In the reverse, when the rocker arm is positioned so that the trailer support surface is at ground level, the proximal end of the stabilizer arm can be at least partially proximal to the pivot point. This position can push the stabilizer end of the tongue lever in the proximal direction, which rotate the rotary tongue 312, so that it forms an angle with the horizontal. One example of this can be seen in FIG. 6A. In a further embodiment, the range of motion that the proximal end of the stabilizer arm travels between the proximal and distal positions, relative to the pivot point 220 is an angle (Z) that is at least 25°, 30°, 35°, 40°, 45°, and/or 50°, or a range of motion between any two of the listed values. In a more specific embodiment, the center of the stabilizer end 319 of the tongue lever travels proximally to distally a distance of at least 1", 1.25", 1.5", 1.75", 2", 2.25", 2.5", 2.75" and/or 3", or a distance between any two of the listed values. Thus, the range of motion of the proximal end of the stabilizer arm can directly affect the travel distance of the tongue lever, which can be directly correlated to the rotation of the rotary tongue.

A system 50 for lowering a trailer body 110 to put the load support surface at ground level can include embodiments of a suspension system 200 and a rotary tongue system 300 of the subject invention that can operate independently or in concert. Where the suspension system and rotary tongue system operate separately, the rotary tongue system can be released or the tongue lever can be unpinned prior to the suspension system be used to lower the trailer support surface to ground level. When the same trailer is to be towed, the suspension system can be used to raise the trailer support surface above ground level raised sufficiently and secured, the rotary tongue system can be used to bring the tongue to the horizontal and secured with the tongue lever. Where the suspension system and rotary tongue system operate in concert or simultaneously, the rotary tongue system can be released or the tongue lever can be unpinned prior to the suspension system be used to lower the trailer support surface to ground level. When the same trailer is to be towed, the suspension system can be used to raise the trailer support surface above ground level, which will simultaneously activate the rotary tongue system to bring the tongue to the horizontal and hold it in that position with the stabilizer arm.

The embodiments of the subject invention provide improvements to towable trailers that can make the trailers easier to use by lowering the trailer support surface to ground level. A suspension system can be used to control the motion of the trailer support surface. A rotary tongue system, which can be used with or apart from the suspension system, can provide motion capabilities to the trailer tongue that allow the trailer support surface to be placed fully at ground level while remaining attached to a towing vehicle. This system 50 for raising and lowering the load support surface of a trailer body to ground level provides a significant improvement to the operation of loading and unloading conventional towable trailers.

Any reference in this specification to "one embodiment," "an embodiment," "example embodiment," "further embodiment," "alternative embodiment," etc., is for literary convenience. The implication is that any particular feature, structure, or characteristic described in connection with such an embodiment is included in at least one embodiment of the invention. The appearance of such phrases in various places in the specification does not necessarily refer to the same embodiment. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

The invention claimed is:

1. A system, configured to raise and lower a trailer relative to a ground level, comprising:
a suspension system, configured on a side of the trailer, the suspension system comprising,
a rocker arm comprising an axle point, a pivot point, a reciprocation point, and a stabilizer point, which are arranged with the axle point distal to the pivot point, the reciprocation point above the pivot point, and the stabilizer point between the pivot point and the reciprocation point, wherein the axle point is configured to support a wheel and the pivot point is configured to be rotatably attached to the trailer;
a pin arranged on the side of the trailer that operably connects to the pivot point to rotatably attach the rocker arm to the side of the trailer;
a reciprocating arm comprising,
a strut comprising a coupling end that engages with the reciprocation point and an actuator end; and
a linear actuator fixedly attached to the side of the towable trailer and in operable connection with the actuator end of the strut, wherein the linear actuator exerts a distal force against the actuator end of the strut to push the coupling end against the reciprocation point, thereby raising the trailer above ground level and wherein, when the reciprocation point moves proximally, the trailer is lowered to ground level,
a rotary tongue comprising,
a trailer tongue having a proximal end, configured for operable connection to a vehicle, and at least one distal end;
a rotary bracket, configured for operable attachment to the trailer, to which the at least one distal end of the trailer tongue is fixedly attached, wherein the rotary bracket rotates to lower and raise the proximal end of the trailer tongue;
a tongue lever, configured on the side of the trailer, having a rotary end fixedly attached to the rotary bracket and a stabilizer end that is securable to inhibit rotation of the rotary bracket and that is unsecurable to allow rotation of the rotary bracket to an angle that facilitates lowering of the trailer to ground level, and a stabilizer arm with a distal end rotatably attached to the stabilizer point on the rocker arm and a proximal end rotatably attached to the stabilizer end of the tongue lever, wherein proximal rotation of the rocker arm simultaneously moves the stabilizer arm proximally to unsecure the tongue lever and distal rotation of the rocker arm simultaneously moves the stabilizer arm distally to secure the tongue lever.

2. The system according to claim 1, further comprising at least one shock absorber operably connected to the reciprocating arm between the reciprocation point and the linear actuator.

3. The system according to claim 2, wherein the shock absorber is a passive shock absorber.

4. The system according to claim 3, wherein the passive shock absorber is a spring secured with at least one brace.

5. The system according to claim 1, further comprising a gear box for controlling the force of the linear actuator.

6. The system according to claim 1, wherein the suspension system further comprises:
a tandem rocker arm distal to the rocker arm, the tandem rocker arm comprising an axle point, a pivot point, and a reciprocation point, which are arranged with the axle point distal to the pivot point and the reciprocation point above the pivot point, wherein the axle point is configured to support a wheel and the pivot point is configured to be rotatably attached to the towable trailer; and a tandem strut comprising a coupling end that engages with the reciprocation point of the tandem strut and an actuator end in operable connection with the linear actuator, such that when the linear actuator exerts the distal force against the strut, a simultaneous force is applied to the tandem strut to push the coupling end of the tandem strut against the reciprocation point of the tandem rocker arm, thereby operating simultaneously with the rocker arm to raise the towable trailer support surface above ground level and wherein release of the distal force on the reciprocation point moves the tandem rocker arm proximally, thereby operating simultaneously with the rocker arm to lower the trailer to ground level.

7. The system according to claim 6, wherein the strut further comprises a bore and the tandem strut passes through the bore, so as to be in operable attachment to the linear actuator.

8. The system according to claim 7, further comprising a shock absorber operably connected to the tandem strut between the reciprocation point of the tandem rocker arm and the reciprocation point of the rocker arm.

9. The system according to claim 8, wherein the shock absorber is passive.

10. The system according to claim 1, wherein a line between a center of the rotary end and a center of the stabilizer end of the tongue lever forms an angle (X) with the trailer tongue that is at least 80°, 85°, 90°, 95°, 100°, 105°, 110°, 115°, or 120°.

11. The system according to claim 1, wherein the trailer tongue forms an angle (Y) relative to a horizontal when the rotary tongue rotates to lower the proximal end of the trailer tongue that is at least 8°, 9°, 10°, 11°, 12°, 13°, 14°, 15°, 16°, 17°, 18°, 19°, 20°, 21°, 22°, 23°, 24°, 25°, 26°, 27°, 28°, 29°, or 30°.

12. The system according to claim 11, further comprising a pin hole in the tongue lever, and
a tongue lever pin that engages with the pin hole, for further securing the tongue lever to the trailer.

13. A method for lowering a load support surface of a trailer the method comprising:
obtaining a trailer according to claim 1,
controlling the linear actuator, of the suspension system, to move the strut proximally, thereby simultaneously pivoting the rocker arm proximally to lower the load support surface to aground level and simultaneously moving the stabilizer point and the stabilizer arm attached thereto proximally to rotate the trailer tongue to a position that facilitates lowering of the load support surface to ground level.

14. The method according to claim 13, further comprising controlling the linear actuator to apply force through the strut to the reciprocation point causing the rocker arm to pivot distally to lower the axle point and raise the load support surface above ground level and simultaneously move the stabilizer point and the stabilizer arm attached thereto distally to rotate the rotary tongue to position the proximal end of the trailer tongue for towing and secure.

15. The method according to claim 14, further comprising a pin hole in the stabilizer end of the tongue lever and a tongue lever pin, wherein the method further comprises securing the stabilizer end of the tongue lever with the tongue lever pin in the pin hole.

16. A system, configured for use with a trailer, comprising:
a suspension system, configured for attachment to a side of the towable trailer, the suspension system comprising,
a rocker arm comprising an axle point, a pivot point, a reciprocation point, and a stabilizer point, which are arranged with the axle point distal to the pivot point, the reciprocation point above the pivot point, and the stabilizer point between the pivot point and the reciprocation point, wherein the axle point is configured to support a wheel and the pivot point is configured to be rotatable attached to the side of the trailer;
a reciprocating arm comprising,
a strut comprising a coupling end, which operably engages with the reciprocation point, and an actuator end;
a linear actuator fixedly attached to the side of the trailer and in operable connection with the actuator end of the strut, wherein the linear actuator exerts a distal force against the actuator end to push the coupling end towards the reciprocation point, thereby raising the trailer above ground level; and wherein, when the coupling end and reciprocation point move proximally, the trailer is lowered to ground level;
a rotary tongue system comprising,
a trailer tongue having a proximal end, configured for operable connection to a vehicle, and at least one distal end;
a rotary bracket, configured for operable attachment to the trailer, to which the at least one distal end of the trailer tongue is fixedly attached, wherein the rotary bracket rotates proximally and distally to lower and raise the proximal end of the trailer tongue, respectively;
a tongue lever having a rotary end fixedly attached to the rotary bracket and a stabilizer end; and
a stabilizer arm with a distal end rotatably attached to the stabilizer point on the rocker arm and a proximal end rotatably attached to the stabilizer end of the tongue lever, such that the stabilizer arm operates simultaneously with the rocker arm to rotate the rotary bracket.

17. The system according to claim 16, further comprising at least one shock absorber operably connected to the reciprocating arm between the reciprocation point and the linear actuator.

18. The system according to claim 17, wherein the shock absorber is a passive shock absorber.

19. The system according to claim 18 further comprising one or more braces on the reciprocating arm that abut the shock absorber.

20. The system according to claim 18, wherein the passive shock absorber is a spring.

21. The system according to claim 16, further comprising a gear box for controlling the linear actuator.

22. The system according to claim 16, wherein the suspension system further comprises:
a tandem rocker arm distal to the rocker arm of the suspension system, the tandem rocker arm comprising an axle point, a pivot point, and a reciprocation point, which are arranged with the axle point distal to the pivot point and the reciprocation point above the pivot point, wherein the axle point is configured to support a wheel and the pivot point is configured to be rotatably attached to the side of the trailer; and
a tandem strut comprising a coupling end that engages with the reciprocation point of the tandem strut and an actuator end in operable attachment to the linear actuator,
such that when the linear actuator exerts distal force against the strut, a simultaneous force is applied to the tandem strut to push the coupling end of the tandem strut towards the reciprocation point of the tandem rocker arm, thereby operating simultaneously with the rocker arm to raise the trailer above ground level and as the distal force is released the reciprocation point of the tandem rocker arm moves proximally, thereby operating simultaneously with the rocker arm to lower the trailer to ground level.

23. The system according to claim 22, wherein the strut further comprises a bore and the tandem strut passes through the bore, so as to be in operable attachment to the linear actuator.

24. The system according to claim 23, further comprising a shock absorber operably connected to the tandem strut between the reciprocation point of the tandem rocker arm and the reciprocation point of the rocker arm.

25. The system according to claim 24, wherein the shock absorber is passive.

26. The system according to claim 25, further comprising one or more braces on the tandem strut between the reciprocation point of the rocker arm and the coupling end of the tandem strut.

27. The system according to claim 25, wherein the passive shock absorber is a spring.

28. The system according to claim 22, comprising a suspension system operably arranged on a first side of the towable trailer and a suspension system operably arranged on a second side of the towable trailer, such that each suspension system is independently operable to raise and lower the respective side of the trailer.

29. The system according to claim 22 further comprising paired rocker arms and paired tandem rocker arms rotatably attached to side of the trailer.

30. The system according to claim 29, wherein the tandem strut passes between the paired rocker arms.

31. The system according to claim 16, wherein a line between a center of the rotary end and a center of the stabilizer end forms an angle (X) with the trailer tongue that is at least 80°, 85°, 90°, 95°, 100°, 105°, 110°, 115°, or 120°.

32. The system according to claim 16, wherein the trailer tongue forms an angle (Y) relative to a horizontal when the rotary tongue rotates to lower the proximal end of the trailer tongue is at least 8°, 9°, 10°, 11°, 12°, 13°, 14°, 15°, 16°, 17°, 18°, 19°, 20°, 21°, 22°, 23°, 24°, 25°, 26°, 27°, 28°, 29°, or 30°.

33. The system according to claim 16, wherein the distance that a center of the stabilizer end travels from the proximal position to the distal position is at least 1", 1.25", 1.5", 1.75", 2", 2.25", 2.5", 2.75", or 3".

34. A method for lowering a trailer, the method comprising:
obtaining a trailer comprising a system, according to claim 16,
controlling the linear actuator, of the suspension system, to move the strut proximally, thereby pivoting the rocker arm proximally to lower the trailer to a ground level and simultaneously moving the stabilizer point with the stabilizer arm attached thereto proximally to rotate the trailer tongue to a position that facilitates lowering of the trailer to ground level.

35. The method according to claim 34, further comprising controlling the linear actuator to apply a distal force through the strut to the reciprocation point to pivot the rocker arm distally and raise the trailer above ground level and simultaneously move the stabilizer point and the stabilizer arm attached thereto distally to rotate the rotary tongue to position the proximal end of the trailer tongue for towing and thereby secure the tongue lever.

* * * * *